United States Patent
Moran et al.

(10) Patent No.: US 6,310,454 B1
(45) Date of Patent: Oct. 30, 2001

(54) APPARATUS AND CONTROL METHOD FOR FEEDER SYSTEM FOR FLOWABLE MATERIAL

(75) Inventors: Robert L. Moran, 16111 Tana Tea Ct., Tega Cay, SC (US) 29751; James L. Flesher, Charlotte, NC (US)

(73) Assignee: Robert L. Moran, Tega Cay, SC (US)

(*) Notice: Subject to any disclaimer, the term of this patent is extended or adjusted under 35 U.S.C. 154(b) by 0 days.

(21) Appl. No.: 09/188,402

(22) Filed: Nov. 6, 1998

Related U.S. Application Data

(60) Provisional application No. 60/064,812, filed on Nov. 7, 1997.

(51) Int. Cl.$^7$ ............................................. G05B 11/01
(52) U.S. Cl. ............................................. 318/560; 318/565
(58) Field of Search ........................ 318/560, 565, 318/568.16, 571

(56) References Cited

U.S. PATENT DOCUMENTS

| | | | |
|---|---|---|---|
| 3,834,473 | 9/1974 | Girard et al. | 177/1 |
| 4,111,336 | 9/1978 | Ward et al. | 222/58 |
| 4,350,243 | * 9/1982 | Weyandt | 198/769 |
| 4,619,336 | 10/1986 | Boyer et al. | 177/116 |
| 4,648,056 | 3/1987 | Wakefield | 364/567 |
| 4,661,920 | 4/1987 | Haze | 364/571 |
| 4,830,508 | 5/1989 | Higuchi et al. | 366/152 |
| 4,872,763 | * 10/1989 | Huguchi et al. | 366/160 |
| 4,880,142 | * 11/1989 | Higuchi et al. | 222/56 |
| 4,896,282 | 1/1990 | Orwell | 364/571.05 |
| 4,976,377 | 12/1990 | Higuchi et al. | 222/55 |
| 5,003,810 | 4/1991 | Jepson et al. | 73/3 |
| 5,142,332 | * 8/1992 | Osawa et al. | 355/208 |
| 5,148,089 | 9/1992 | Adachi et al. | 318/66 |
| 5,363,023 | * 11/1994 | Choho | 318/70 |
| 5,410,495 | 4/1995 | Ramamurthi | 364/511.05 |
| 5,530,503 | * 6/1996 | Takahashi et al. | 354/173.1 |
| 5,742,445 | * 4/1998 | Inazawa et al. | 360/71 |

OTHER PUBLICATIONS

*An Introduction To Fuzzy Control Systems* by Greg Goebel from Internet Site:www.ics.soton.ac.uk/research/nfinfo/fuzzycontrol.html.

* cited by examiner

Primary Examiner—Robert E. Nappi
Assistant Examiner—Rina I. Duda
(74) Attorney, Agent, or Firm—Kennedy Covington Lobdell & Hickman, LLP

(57) ABSTRACT

An apparatus for precisely controlling the feed rate of a feeder comprises: a motor operatively connected to the feeder to cause dispensing of the feeder when the motor is driven; a control circuit for supplying, when actuated, an AC voltage supply to the motor for driving of the motor; a counter disposed in communication with the control circuit for actuation thereof when an overflow signal is generated by the counter; a latch controller disposed in communication with the counter for enablement and disablement of the counter, the latch controller disabling the counter when the overflow signal is generated by the counter; a detector connected to the AC voltage supply for detecting when the AC voltage crosses over a median voltage thereof, the detector further disposed in communication with the latch controller for enablement of the counter when the median voltage is detected; and a fuzzy logic controller disposed in communication with the counter for generating an output to the counter that loads a determined count into the counter such that the counter generates an overflow signal within a time interval equal to a determined percentage of the half period of the AC voltage. The control circuit includes a pair of silicon control rectifiers disposed in parallel but reversed to one another resulting in each silicon control rectifier being able to supply the AC voltage to the motor during opposite half periods of a time period of the AC voltage if continuously actuated.

13 Claims, 3 Drawing Sheets

APPARATUS AND CONTROL METHOD FOR FEEDER SYSTEM FOR FLOWABLE MATERIAL

The benefit of the filing date of Nov. 7, 1997, of Moran et al. U.S. provisional patent application Ser. No. 60/064,812 is hereby claimed pursuant to 37 C.F.R. §1.73.

BACKGROUND OF THE PRESENT INVENTION

The present invention relates broadly to bulk material supply systems and, more particularly, to a feed system for bulk solids and its associated controller wherein the controller employs fuzzy logic for rapid reactions to changes in weight.

Bulk solids appear throughout industry and must be handled or processed in a manner which will provide consistent results without waste. Examples of industries which utilize bulk solids include food, lumber, paper, chemical, petroleum refining, rubber, stone, clay, glass, and concrete. The bulk solid materials may include such diverse items as cabbage flakes, bleach, bauxite, baking soda, fiberglass, flour, grass seed, iron ore, starch, sugar, raisins, parsley, noodles, nylon, mineral fiber, mica, lime, and detergent. All of these materials share a common feature in that they are flowable solids. They are fungible materials which may be poured for filling into containers or otherwise metered under flow conditions for processing.

Typically, such processing includes providing a hopper filled with the bulk material with some form of regulator or metering device providing the necessary flow control for processing.

One method of determining how much bulk solid material has been dispensed during any given dispensing operation is by using the so-called loss-in-weight method. There, the hopper containing the bulk material is continually weighed and the reduction in weight is indicative of the material dispensed.

Further, the reduction in weight-per-unit time is indicative of the rate at which a predetermined amount of the bulk material is dispensed. Therefore, by precisely determining the change in weight of the hopper, a precise indication of the amount of material dispensed is realized. This information can be used for controlling the feed process. Furthermore, while the present invention is described for operation with a vibratory feeder, it should be noted that it is equally effective with screw feeders or belt feeders. The focus of the present invention lies in its applicability to loss-in-weight feeders.

A common method which is used to control dispensing of bulk solids is the proportional method used throughout the industry. The setpoint for such control method is a desired rate of change of weight for a supply of the bulk solid. However, because the control variable (the weight change) is the integral of the rate of weight change and not the rate of weight change itself, the proportional control method currently used in the industry, while reliable, is clumsy and lacks a certain amount of precision.

Several methods may be used to control the actual feed of the bulk solid material. Valves may be used which are open proportionally or open for a certain time period. Other methods include the use of a belt feeder or a screw feeder. A vibratory feeder is disclosed in Peschl U.S. Pat. No. 3,973,703. There, a vibrating tray is disclosed containing a number of plates in an angular relationship to one another. According to this method, the bulk material will not flow unless the feeder is vibrated or otherwise agitated in some manner. Such feeders allow for precise flow with the flow rate being based on the amplitude of vibration or agitation. This type of feeder can provide accurate flow characteristics and can respond rapidly to changing inputs from an associated excitation motor. The motor is driven responsive to a control variable. As discussed above, the current proportional controllers are slow to respond to changes in demand or process changes and, therefore, the precision and rapid changing characteristics of any loss in weight type feeders including the vibratory feeder are not fully realized using a proportional controller.

SUMMARY OF THE PRESENT INVENTION

It is accordingly an object of the present invention to provide a feed control system which precisely controls a vibratory feeder and offers rapid response to a change in demand.

Briefly summarized, the method of the present invention includes determining an appropriate change to a regulator that controls an outflow of a flowable material from a supply of the flowable material. The method includes the steps of, for a plurality of small time intervals during the outflow, (a) calculating average values representative of a rate of weight change of the supply of the flowable material; (b) calculating average values representative of a rate error based on the calculated average values for the rate of weight change and based on a setpoint value for the rate of weight change; (c) calculating values representative of the change in the rate error based on the calculated average values for the rate error; and (d) determining a value representative of an appropriate change to the regulator for controlling the outflow by applying fuzzy logic control to the calculated average values representative of the rate error and the calculated values representative of the change in the rate error.

Preferably, the method further comprises weighing the supply of the flowable material during the plurality of small time intervals as well as determining the setpoint value by weighing the outflow of the flowable material.

The apparatus of the present invention precisely controls the feed rate of the feeder and itself includes: (a) a motor operatively connected to the feeder which causes dispensing of a flowable material by the feeder when the motor is driven; (b) a control circuit operatively connected to the motor which provides a voltage supply to the motor for driving the motor when the control circuit is actuated; (c) a counter disposed in communication with the control circuit for actuating the control circuit after a determined time interval; and (d) a fuzzy logic controller disposed in communication with the counter for determining the time interval.

Preferably, the voltage supply is AC voltage and the determined time interval ranges between zero and one-half of a time period of the AC voltage. Furthermore, the apparatus preferably includes a sensor disposed in communication with the fuzzy logic controller for measuring a weight of a supply of flowable material that is dispensed by the feeder.

In a feature of the present invention, the control circuit deactuates at a recurring point in time. Preferably, the recurring point in time is a crossover of a median voltage of the AC voltage supply. Furthermore, the counter preferably restarts at the recurring point in time as well.

The preferred embodiment of the apparatus of the present invention includes: (a) a motor operatively connected to the feeder to cause dispensing of the feeder when the motor is driven; (b) a control circuit for controlling the driving of the motor, the control circuit including a pair of silicon control rectifiers disposed in parallel but reversed to one another with each silicon control rectifier operatively connected to the motor such that, when each silicon control rectifier is fired, an AC voltage is supplied to the motor and the motor is driven, the parallel and reversed disposition of the silicon control rectifiers in the control circuit resulting in each silicon control rectifier being able to supply the AC voltage to the motor during opposite half periods of a time period of the AC voltage; (c) a counter disposed in communication with each of the silicon control rectifiers for actuation thereof when an overflow signal is generated by the counter; (d) a latch controller disposed in communication with the counter for enablement and disablement of the counter with the latch controller disabling the counter when the overflow signal is generated by the counter; (e) a detector connected to the AC voltage for detecting when the AC voltage crosses over a median voltage thereof with the detector being further disposed in communication with the latch controller, with the detector generating a signal to the latch controller for enablement of the counter when the median voltage is detected; (f) a fuzzy logic controller disposed in communication with the counter for generating an output to the counter that loads a determined count into the counter such that the counter generates an overflow signal within a time interval equal to a determined percentage of the half period of the AC voltage, whereby each silicon control rectifier is fired for the determined percentage of the half period of the AC voltage, the counter retaining the determined count until a different determined count is loaded into the counter by the fuzzy logic controller; (g) a sensor that measures a weight of a supply of flowable material that is dispensed by the feeder for calculation of a rate of weight change of the supply of flowable material; and (h) a second sensor disposed for measurement of a weight of the flowable material dispensed by the feeder and a time interval of the dispensing for calculation of a setpoint value.

Furthermore, the fuzzy logic controller includes an analog-to-digital converter, a moving average filter, and a fuzzy logic processor including a predetermined rule base, whereby the fuzzy logic controller compares the rate of weight change of the supply of flowable material and the setpoint value for determination of the percentage of the half period of the AC voltage before the controller generates the overflow signal.

DESCRIPTION OF THE PREFERRED EMBODIMENT

Figure 1:
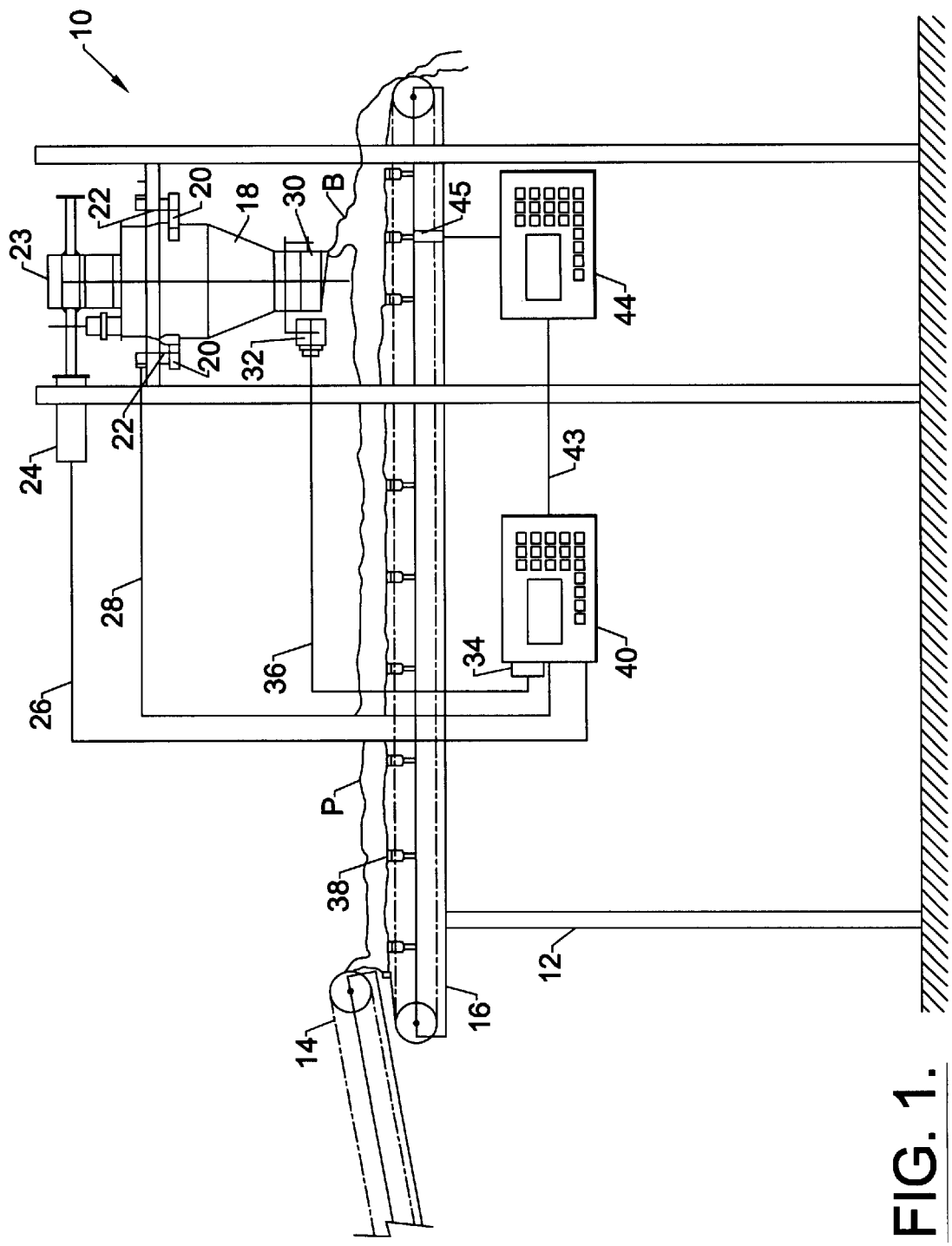
FIG. 1 is diagrammatic view of a bulk material handling system employing a controller according the preferred embodiment of the present invention.

According to the present invention, a controller is provided which uses fuzzy logic reasoning to provide control signals to silicon control rectifiers (SCRs) which drive an electric motor that causes vibration of the feeder for dispensing bulk solids.

To that end, the present invention provides a fuzzy logic based processor which produces an output signal for controlling the firing of a pair of SCRs which control through a motor the excitation of a vibratory feeder for feed rate control when dispensing bulk solid material. The system employs a hopper which is suspended on load cells. The hopper contains a predetermined amount of bulk solid material for dispensing and is replenished from a material supply in a controlled manner. In reality, the combined weight of the electromagnetic drive motor, feed tray, hopper, suspended components and material is weighed using the load cells with all weight except for the material "zeroed out" electronically.

The output from the load cells is sent to the controller and, initially, to an anti-aliasing filter. High frequencies, which in analog controllers normally are effectively eliminated by the low pass filtering, may because of "aliasing" appear as low frequency signals in the bandwidth of the sample control system. The anti-aliasing filter effective eliminates all signal components with frequencies above half the sampling frequency. From there, the signal is fed to an analog to digital converter which is Preferably an oversampling sigma-delta type of charge balancing converter. The output of the converter enters a programmable digital filter with notch frequencies of the filter set to 5, 10, 25, 30, 50, or 60 hertz depending on the controller. Analog to digital conversion occurs at a rate that is a function of notch frequency. The rate may be expressed as time=1/notch frequency. The output code from the filter results in a converted signal of 24 bits with no missing codes and 0.0015% nonlinearity. This corresponds to a full-scale count of 16,777,216 before post filtering. The software reads a 24-bit word at a rate equal to the notch frequency for which the programmable filter has been set. The software then places this count into two moving average filters, one for use by the display and one to be used by the control algorithm. A number of averages for each post filter is entered independently. In general, a small number of averages in the control filter allows f or fast, tight control and a larger number in the display filter allows for more readable display of rate output.

Analog to digital conversion occurs every 100 milliseconds provided the notch frequency is 10 Hz, with a digital count representing the combined weight of the hopper, feeder, and material being dispensed. A 5 Hz notch frequency will result in a conversation rate of 200 milliseconds. The digital count is stored in a circular ring buffer which is used to average the weight. The number of counts to be averaged equals the number of filter samples. The ring buffer stores a predetermined number of samples. As each new sample is introduced, the oldest sample in residency is subtracted from the running total and the newest sample is added to the running total with the average count being computed by dividing the running total by the number of filter samples.

This average count is then converted to a weight value by subtracting the tare count, which amounts to deducting the weight of the container and everything supported by the load cells except for the material, and then multiplying the difference by the weight to count ratio which was predetermined during calibration. The change in weight is computed by subtracting the current weight from the previously measured weight, with the current weight being stored as the new previous weight. Rate is computed by multiplying the change in weight value by the rate per minute factor. The rate is stored in a circular ring buffer which is used to provide an average in a manner discussed previously.

The computer then undertakes fuzzy logic processing based on the change in weight and the rate of weight change. The frequency of performing the fuzzy logic processing is controlled by an update value which is entered by the operator and is a multiple of 100 milliseconds. This time period is also a function of the notch frequency. As is known with fuzzy logic, a rule base is provided and appears as follows:

The fuzzy logic rule base has two inputs. One is the rate error and the other is the change in rate error since last processing cycle. The rate error is determined by subtracting the calculated change in weight from the measured change in weight with the calculated change in weight being computed from the rate setpoint, the rate per minute factor, and the frequency of the fuzzy logic processing cycle. The change in rate error is computed by subtracting the previous rate error from the current rate error. The current rate error is then stored as the new previous rate error.

Basically, the analysis of the rate error and the change in rate error proceeds in four steps. Under fuzzification, the membership functions defined on the input variable are applied to their actual values, to determine the degree of truth for each rule premise. Under inference, the truth value for the premise of each rule is computed, and applied to the conclusion parity of each rule. This results in one fuzzy subset to be assigned to each output variable for each rule. The output membership function is scaled by the rule premise's computed degree of truth.

Under composition, all of the fuzzy subsets assigned to each output variable are combined together to form a single fuzzy subset for each output variable. Using MAX-DOT inference, the combined output fuzzy subset is constructed by taking the pointwise maximum over all of the fuzzy subsets assigned to variables by the inference rule. Finally, the present invention employs centroid defuzzification, which is used to convert the fuzzy output set to a crisp number. The crisp number may then be employed to control the vibration of the feeder. In the centroid method, the crisp value of the output variable is computed by finding the variable value of the center of gravity of the membership function for the fuzzy value. The present fuzzy logic rule base produces an output which is a percentage value. The output is then multiplied by the gain value. The resulting value is algebraically added to the SCR percent value by the computer, which directly controls the firing of the SCRs. The firing of the SCRs controls the electromagnetic drive motor.

The membership functions are as follows:
Membership Function—Rate Error:
Range of input is −1 to +1.
Member negative points are −1,1 −0.5,1 0,0
Member zero points are −0.5,0 0,1 0.5,0
Member positive points are 0,0 0.5,1 1,1
Membership Function—Change in Rate Error:
Range of input is −1 to +1.
Member negative points are −1,1 −0.5,1 0,0.
Member zero points are −0.5,0 0,1 0.5,0
Member positive points are 0,0 0.5,1 1,1
Membership Function—Output Change Percentage:
Range of output is −1000 to +1000.
Membership negative points are −1000,0 −833.33,1 −666.66,0
Membership zero points are −166.66,0 0,1 166.66,0
Membership positive points are 666.66,0 833.33,1 1000,0
The rule base contains nine rules which follow:
1. If rate error is N and change in rate error is N, then output change percentage is P.
2. If rate error is N and change in rate error is Z, then output change percentage is P.
3. If rate error is N and change in rate error is P, then output change percentage is N.
4. If rate error is Z and change in rate error is N, then output change percentage is P.
5. If rate error is Z and change in rate error Z, output change percentage is Z.
6. If rate error is Z and change in rate error is P, then output change percentage is N.
7. If rate error is P and change in rate error is N, then output change percentage is P.
8. If rate error is P and change in rate error is Z, then output change percentage is N.
9. If rate error is P and change in rate error is P, then output change percentage is N.

In the above rule base, P represents positive, N represents negative, and Z represents zero.

The main algorithm for the MAX-DOT centroid method for fuzzy interfacing is as follows:

$$V = \sum_{i=1}^{n} \alpha_i M_i \bigg/ \sum_{i=1}^{n} \alpha_i A_i W_i$$

where:
V is the variable value at the centroid of the fuzzy set,
$\alpha_i$ is the degree of membership computed for the premise of rule i,
$W_i$ is the weight assigned to the rule i,
$M_i$ is the moment of the membership function assigned to V in rule i around zero, and
$A_1$ is the area of the membership function assigned to V in rule i.

The electromagnetic drive motor, which controls the vibration of the feeder, requires an input of between 0 and 115 VAC for corresponding amplitudes of vibration between 0% and 100% (corresponding to 0.000 inches to 0.060 inches). The SCR drive control works by turning on the SCRs for a percentage of each half cycle of the AC line voltage. In full wave control an SCR is needed for each polarity of a line, this being accomplished by placing two SCRs in parallel with one reverse from the other. If each SCR conducts for half of its corresponding half cycle, 50% of the line voltage is the average voltage sent to the load. Once an SCR is turned on, the SCR stays on until the current flowing through it drops to 0, i.e., when the AC line reverses polarity.

The control circuit includes a "zero crossing detector". This circuit generates a narrow pulse at each crossing of zero volts of the AC line voltage. This occurs every 8.33 milliseconds for a 60 cycle line. When the zero crossing pulse occurs, it sets a latch whose output enables the 16 bit counter to count. The counter is clocked by a crystal oscillator at 7.3728 MHz. If the counter had a net count of zero when it was enabled, it would take 65536 counts of the clock to fill the counter and generate an overflow. With a clock of 7.3728 MHz, each cycle is 135 nanoseconds. Therefore, the 65536 counts ×135 nanoseconds =8.888 milliseconds or little more time than one-half of the AC cycle. If a small count of 4500 is loaded into the counter, the first clock pulse after zero crossing enables the counter and it will take almost the entire half cycle for an overflow to occur. This overflow signal does two things. Initially, it triggers the SCRs. It also resets the control latch disabling the counter until the next zero crossing. The firing of an SCR just before zero crossing results in an average output voltage of almost zero volts. This happens every 8.333 milliseconds without any intervention from the software. If a large count is loaded into the counter, e.g., 64,000, the SCRs are turned on just after the zero crossing and the output voltage will approximate the line voltage. These minimum and maximum counts are scaled in the software to be 0% to 100% output. Using this method of triggering the SCRs, minimum software intervention is required because if the output does not need to change the software need do nothing. The circuit runs by itself. If the output needs to change, the software writes the new number once and the output is changed at the next zero crossing.

By employing the fuzzy logic controller in combination with the zero crossing detector, the software can cooperate with the zero crossing detector to rapidly change the firing rate of the SCRs thereby controlling the feeder in a precise manner.

Turning now to the drawings and, more particularly to FIG. 1, a bulk material handling system is generally indicated at 10 and includes a skeletal frame 12 supporting the components of the system. A product conveyor 16 is formed as a driven, endless belt system for carrying a fungible, flowable product P (such as strawberries) on the top flight thereof. The product P is emitted from a feeder conveyor 14 disposed at one end of the product conveyor 16. A series of idlers 38 supports the top flight of the conveyor 16. The product conveyor 16 conveys the product P through the handling system. A 5 hopper 18 is formed as an inverted, frusto-conical member having a replenishment feeder 23 at an open, upper end thereof. A vibrational distribution feeder 30 is disposed at the lower, open end of the hopper 18 at a position spaced a predetermined distance from the product conveyor 16 for depositing bulk material B (such as sugar) on the product P on the conveyor 16. The vibrational feeder 30 includes an electromagnetic drive motor 32 being controlled by two silicon controlled rectifiers (SCRs) contained within a SCR controller illustrated generally at 34. The replenishment feeder 23 is controlled by a refill gate 24 operationally attached thereto. The hopper 18 is suspended on load cells 20 by cables 22.

The present invention also includes two microprocessor or computer-based controls. Initially, a weight speed multiplier 44 is mounted to the frame 12 and operatively connected to a load cell 45 associated with one of the idlers 38 in contact with the product conveyor 16 to determine the amount of bulk material dispensed and time of the dispensing.

A second computer-based control is the rate controller 40 and receives input from the operator and, through other various other inputs as will be discussed in greater detail hereinafter, controls firing of the SCRs to excite the electromagnetic drive motor 32 to control the vibrational feeder 30. The rate controller 40 receives input from the weight speed multiplier 44 to coordinate the operation of the vibrational feeder 30 with the operation of the product conveyor 16. An electrical output signal is supplied through control lines 26 from the rate controller 40 to the refill gate 24 to replenish the hopper 18 when the bulk material supply gets low. The rate controller 40 receives an electrical signal from the load cells 20 through electric line 28 from which the rate error and change in rate error are determined. An output line extends from the rate controller 40 to the SCR controllers 34 for controlling the vibrational feeder 30.

Figure 2:
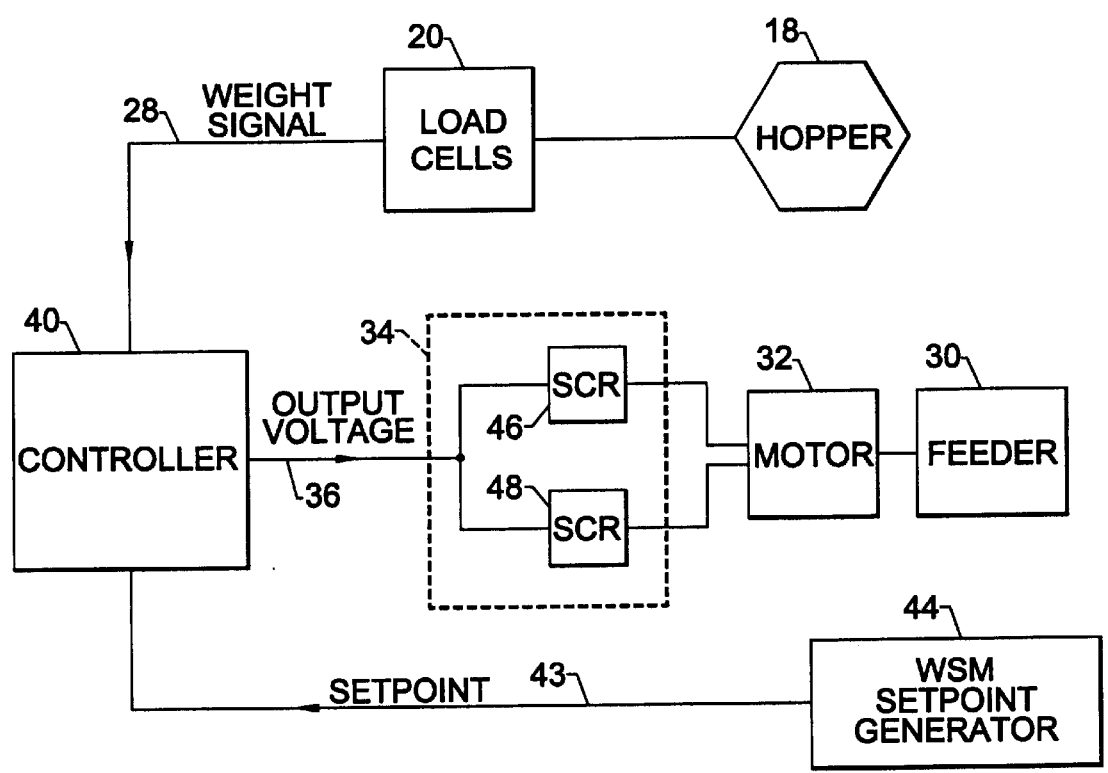
FIG. 2 is a block diagram of the external components of the feeder control system.

The external arrangement can also be seen in FIG. 2. There, in a block form, it can be seen that controller 40 is operationally connected to the load cells 20 through control line 28. The load cells 20 are physically connected to the hopper 18. The hopper/load cell arrangement provides the primary input to the fuzzy logic controller 40. Additionally, the weight speed multiplier 44 supplies a coordinating signal (the setpoint) through electric line 43 to the rate controller 40. The output of the rate controller 40 is transmitted through electrical line 36 to the SCR controller 34 including two SCRs 46,48 which excite the drive motor 32 for operating the vibrating feeder 30.

Figure 3:
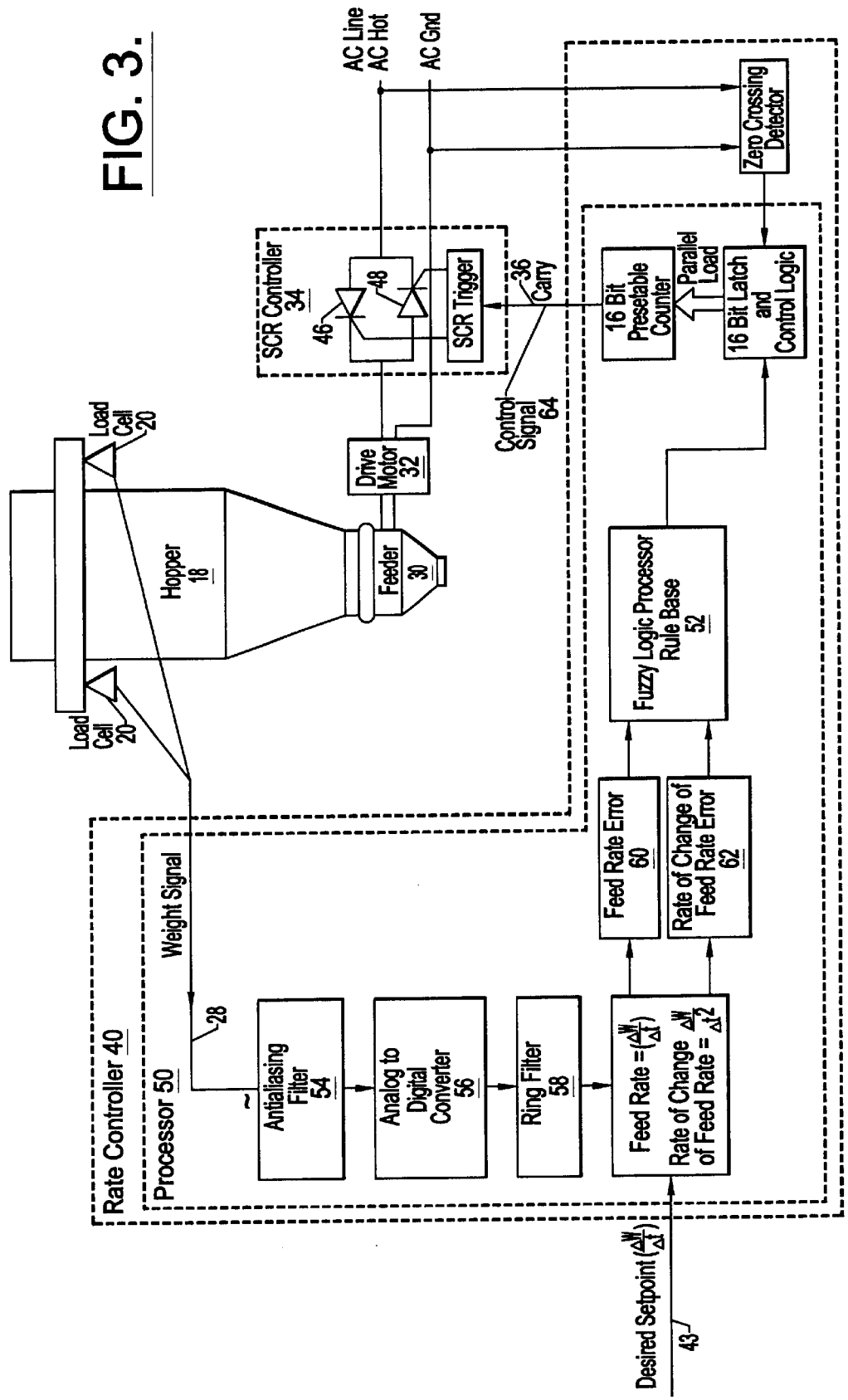
FIG. 3 is a block diagram of the fuzzy logic processor.

Turning now to FIG. 3, the internal processor is illustrated generally in broken lines at 50. The output from the load cells 20 is administered to an anti-aliasing filter 54 which acts to remove aliases of the primary frequency of interest. The anti-aliasing filter 54 sends its output signal to an analog/digital converter 56 which provides a digital output for processing by the fuzzy logic controller. The digital output signal is fed to the ring buffers 58 and the output of these is the rate error 60 and the change in rate error 62 which are fed to the fuzzy logic rule base 52 for processing with the output appearing on output signal line 64.

In operation, the conveyor 16 is moved under the vibratory feeder 30 and receives bulk material from the hopper according to controlled vibrations of the vibrating feeder 30. The load cells 20 monitor the change in weight and continually feed this information along lines 28 to the main controller 40. Meanwhile, the weight speed multiplier 44 is receiving input from the load cell 45 associated therewith regarding speed and weight carried on the top flight of the conveyor 16. The output of the main load cells 20 is processed using the anti-aliasing filter 54, the analog to digital converter 56, and the ring buffers 58 to arrive at a value for the rate error 60 and a value for the rate of change of the weight error 62. Mapping of these values 60,62 are made according to fuzzy logic membership functions and the results are applied to a fuzzy logic controller comprising a rule base 52 within the rate controller 40, and the output variable appears as a control signal 64 which controls the firing of the SCRs which, in turn, controls the rate at which the vibrational feeder dispenses bulk material product.

The above system provides a rapid and precise apparatus for controlling the amount of bulk solid material distributed during a process.

Moreover, it is contemplated within the scope of the present invention that, while less precise, a single SCR could be used in the control circuit, whereby dead time would occur during each cycle when no voltage could be applied to the motor. Furthermore, it is also contemplated that, while the control circuit described in the preferred embodiment includes two SCRs disposed in parallel, reversed configuration, other electronic components can be used such as diodes and transistors with the desired result.

It will therefore be readily understood by those persons skilled in the art that the present invention is susceptible of broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. An apparatus for precisely controlling the driving of a motor, comprising:

(a) a control circuit operatively connected to the motor which provides a voltage supply to the motor for driving the motor when the control circuit is actuated, wherein said control circuit deactuates at a recurring point in time, wherein the voltage supply is AC voltage and said recurring point in time is a crossover by the AC voltage of a median voltage thereof, (b) a timing circuit disposed in communication with said control circuit for actuating said control circuit after a determined time interval; and (c) a fuzzy logic controller disposed in communication with said timing circuit for determining said time interval.

2. The apparatus of claim 1, wherein said timing circuit includes a counter, and wherein said counter restarts at said recurring point in time.

3. An apparatus for precisely controlling the feed rate of a feeder, comprising:

(a) a motor operatively connected to the feeder to cause dispensing of the feeder when said motor is driven;

(b) a control circuit for controlling the driving of said motor, said control circuit including a pair of silicon control rectifiers disposed in parallel but reversed to one another, each said silicon control rectifier operatively connected to said motor such that, when said silicon control rectifier is fired, an AC voltage is supplied to said motor and said motor is driven, the parallel and reversed disposition of said silicon control rectifiers in said control circuit resulting in each said silicon control rectifier being able to supply the AC voltage to said motor during opposite half periods of a time period of the AC voltage;

(c) a counter disposed in communication with each of said silicon control rectifiers for actuation thereof when an overflow signal is generated by said counter;

(d) a latch controller disposed in communication with said counter for enablement and disablement of said counter, said latch controller disabling said counter when the overflow signal is generated by said counter;

(e) a detector connected to the AC voltage for detecting when the AC voltage crosses over a median voltage thereof, said detector further disposed in communication with said latch controller, said detector generating a signal to said latch controller for enablement of said counter when said median voltage is detected; and (f) a fuzzy logic controller disposed in communication with said counter for generating an output to said counter that loads a determined count into said counter such that said counter generates an overflow signal within a time interval equal to a determined percentage of the half period of the AC voltage, whereby each said silicon control rectifier is fired for the determined percentage of the half period of the AC voltage.

4. The apparatus of claim 3, wherein said counter retains said determined count until a different determined count is loaded into said counter by said fuzzy logic controller.

5. The apparatus of claim 3, further including a sensor that measures a weight of a supply of flowable material that is dispensed by the feeder for calculation of a rate of weight change of the supply of flowable material.

6. The apparatus of claim 5, further comprising a second sensor disposed for measurement of a weight of the flowable material dispensed by the feeder and a time interval of the dispensing for calculation of a setpoint value.

7. The apparatus of claim 6, wherein said fuzzy logic controller includes an analog-to-digital converter, a moving average filter, and a fuzzy logic processor including a predetermined rule base whereby said fuzzy logic controller compares the rate of weight change of the supply of flowable material and the setpoint value for determination of the percentage of the half period of the AC voltage.

8. An apparatus for controlling the feed rate of a feeder, comprising:

(a) a motor control circuit including a pair of silicon control rectifiers;

(b) a counter disposed in communication with each of said silicon control rectifiers;

(c) a latch controller disposed in communication with said counter; and (d) a detector connected to an AC voltage and to the latch controller for detecting when the AC voltage crosses over a median voltage.

9. The apparatus of claim 8, further including a fuzzy logic controller disposed in communication with said counter for loading a determined count into said counter, wherein said counter generates an overflow signal within a time interval equal to a determined percentage of the half period of the AC voltage, whereby each of said silicon control rectifiers is fired for the determined percentage of the half period of the AC voltage.

10. The apparatus of claim 9, wherein said counter retains said determined count until a different determined count is loaded into said counter by said fuzzy logic controller.

11. The apparatus of claim 9, further including a sensor that measures a weight of a supply of flowable material that is dispensed by the feeder for calculation of a rate of weight change of the supply of flowable material.

12. The apparatus of claim 11, further comprising a second sensor disposed for measurement of a weight of the flowable material dispensed by the feeder and a time interval of the dispensing for calculation of a setpoint value.

13. The apparatus of claim 12, wherein said fuzzy logic controller includes an analog-to-digital converter, a moving average filter, and a fuzzy logic processor including a predetermined rule base whereby said fuzzy logic controller compares the rate of weight change of the supply of flowable material and the setpoint value for determination of the percentage of the period of the AC voltage.

* * * * *